April 13, 1954     G. R. EVERHART ET AL     2,674,768
CORNER JOINT
Filed Sept. 20, 1949     2 Sheets-Sheet 1

INVENTORS
GEORGE R. EVERHART
ANGUS N. McKAY
EDWARD A. DANFORTH
BY
Mellin + Hanson
ATTORNEYS April 13, 1954 G. R. EVERHART ET AL 2,674,768
CORNER JOINT
Filed Sept. 20, 1949 2 Sheets-Sheet 2

INVENTORS
GEORGE R. EVERHART
ANGUS N. McKAY
EDWARD A. DANFORTH
BY
Mellin + Hanscom
ATTORNEYS Patented Apr. 13, 1954

2,674,768

UNITED STATES PATENT OFFICE 2,674,768

CORNER JOINT

George R. Everhart, Los Angeles, Angus N. McKay, San Francisco, and Edward A. Danforth, Palo Alto, Calif., assignors, by mesne assignments, to T. S. Walker, Redwood City, Calif.

Application September 20, 1949, Serial No. 116,732

5 Claims. (Cl. 20—92)

This invention relates to a corner structure. More particularly, it relates to a corner structure adapted for use with counter tops and the like having coved back splashes and end splashes and wherein the coved surfaces are formed of a thermosetting plastic which lends itself to coving or curvature by application of heat and pressure but which, because of its physical characteristics, does not lend itself to drawing so as to provide a balled corner.

As set forth in Beach et al. United States Patent No. 2,433,643, granted December 30, 1947, entitled "Process of Treating Phenolic Sheet," a large variety of thermosetting plastic materials, such as phenol-aldehyde and melamine resins, when provided in the form of flat sheets, can be coved to provide a curvature of large or small radius, by the application of heat and pressure in the manner set forth in the patent. This process has found wide application in the decorative field, e. g., in counter tops, sink tops, the walls of stall showers and other similar household structures.

In the fabrication of such structures, known thermosetting plastic materials are provided in sheet form, e. g., "Formica" which is the trademark of a product of the Formica Company of Cincinnati, Ohio, and which comprises a phenol-formaldehyde-impregnated paper stock as the base and an overlay of printed paper impregnated with a melamine resin to provide hard, durable surface layer having the desired color and pattern. This and other similar sheet materials such as Micarta (trade-mark of a product of the Westinghouse Electric and Manufacturing Company of Pittsburgh, Pennsylvania) and Farlite (trade-mark of a product of Farley and Loetscher of Dubuque, Iowa) are coved in the manner described in the aforesaid Beach patent and are bonded, either before or after coving, to a suitable core such as a plywood core.

The method of said Beach patent is adequate as applied to two intersecting surfaces. However, in a corner involving three intersecting surfaces lying in three different planes, difficulty is encountered owing to the fact that the plastic sheet material does not lend itself to drawing operations to provide a balled corner. Thus, the paper stock included as a component part of the plastic sheet material is likely to tear when subjected to a drawing operation.

Expedients previously employed to overcome this problem have been unsatisfactory. According to one method, only two of the intersecting surfaces are coved; e. g., in a corner structure comprising a deck, an end splash and a back splash, the intersection of the deck and the back splash will be coved while the intersection of the deck and the end splash will be left uncoved to provide a right-angular intersection. This is obviously unsatisfactory because the full advantages of coving are not achieved. Another method employed is to form the deck, for example, in two abutting sections cut along a diagonal. This is disadvantageous for several reasons. In the first place, a considerable waste of sheet plastic material is involved. Secondly, additional manufacturing operations are involved. Thirdly, an additional joint is provided which is exposed to water, is apt to accumulate dirt and detracts from the overall appearance of an installation.

It is an object of the present invention to provide an improved corner structure suitable for employment with three intersecting surfaces.

It is a further object of the invention to provide a corner structure adapted to use with a coved structure which makes it possible to achieve substantially the full advantages of coving and at the same time involves a minimum waste of materials and a minimum of manufacturing operations and also does not materially aggravate the problem of exposed joints or abutting edges.

These and other objects of the invention will be apparent from the ensuing description and the appended claims.

The invention is exemplified in the following description and illustrated by way of example in the accompanying drawings in which.

Figure 1:
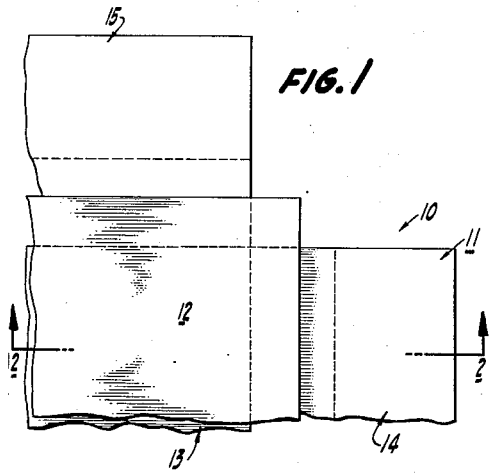
Fig. 1 is a fragmentary plan view of a blank-and-die assembly as provided for forming a coved corner section.
Figure 2:
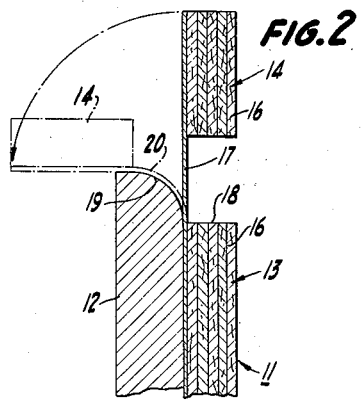
Fig. 2 is a section taken along the line 2—2 of Fig. 1, showing also in dotted lines the formation of a coved intersection.

Referring now to the drawings and more particularly to Figs. 1 and 2, there is shown in Fig. 1 an assembly which is generally designated as 10 comprising a preformed blank 11 and a die 12. The blank 11, as illustrated, comprises a deck portion 13, an end splash 14 and a back splash 15. Each portion of the blank, namely, the deck 13, end splash 14 and back splash 15, is formed of a suitable core 16, preferably plywood as illustrated, to which is bonded a sheet 17 of thermosetting plastic material, such as "Formica," any of the other plastic sheet materials referred to hereinabove or any other sheet material suitable for the purpose. The sheet plastic is bonded to the core by any suitable means, as by means of a suitable adhesive and the application of heat and pressure. The manner of bonding or laminating the sheet plastic to the core is well known in the art and need not be described here.

As is also illustrated, the end splash 14 and the back splash 15 are both spaced somewhat from the deck 13 to provide a recess which is, of course, bridged by the sheet material 17. The recess 18 is provided to permit coving of the intersecting surfaces about the curved edges 19 of the die 12. A coved portion 20 is thus produced which is illustrated in broken lines in Fig. 2 and in plan view and in perspective in Figs. 3 to 6.

As indicated hereinabove, the coving may be carried out by any suitable method, preferably by the method of the aforesaid Beach patent; namely, by providing a die of suitable curvature or radius, heating the sheet plastic to a suitable temperature, e. g., to about 350° F. for a few minutes until the plastic has become somewhat pliable so that under the application of moderate pressure it will assume the shape of the die. The method of coving is also well known in the art and need not be described in detail herein.

Figure 3:
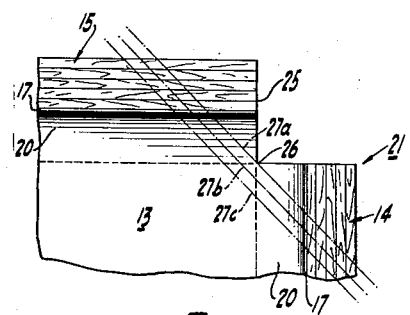
Fig. 3 is a fragmentary top plan view of a coved corner section before it has been cut and before the cornerpiece has been mounted.
Figure 5:
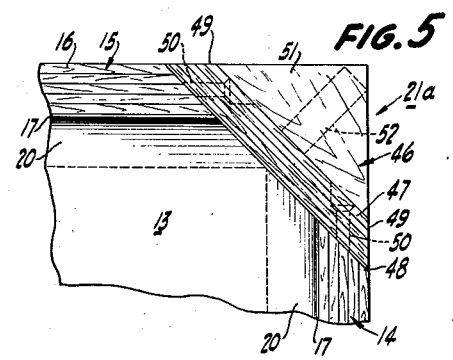
Fig. 5 is a top plan view similar to that of Fig. 3, but after cutting and with the cornerpiece mounted.
Figure 4:
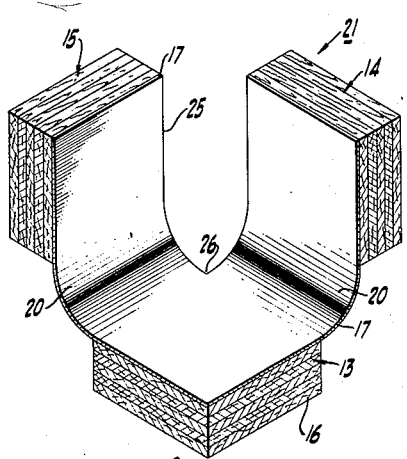
Fig. 4 is a perspective view of the corner section of Fig. 3.
Figure 6:
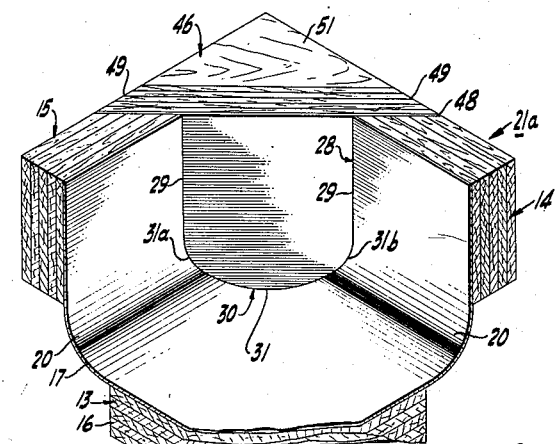
Fig. 6 is a perspective view of the corner section of Fig. 5.

There is thus formed a coved unit 21 which is illustrated fragmentarily in Figs. 3 and 4. It will be noted that this unit has a corner portion or recess 25 which is right-angular in horizontal section and which terminates in a V-shaped corner or apex 26. This corner is curved and it does not lie in one plane. In accordance with our invention, a typical corner section, such as illustrated in Figs. 3 and 4, is modified to provide a corner section 21a as illustrated in Figs. 5 and 6. To this end, it is necessary to make a diagonal cut as illustrated by the dotted lines 27a, 27b and 27c in Fig. 3. The depth of the cut will ordinarily be determined by the radius of the coves 20. Thus, with a cove of relatively short radius, the cut will be taken on the outermost line 27a. A cove of greater radius will require cutting along one of the inner lines 27b or 27c. However, some latitude is allowable; it is desirable to cut the unit 21 along a 45° diagonal which passes through the point 26 where the two coved surfaces meet, but cutting along a different angle, or inwardly of the point 26 is permissible.

It will be seen from Fig. 6 that a U-shaped corner opening or recess 28 is formed which lies entirely in one plane. This plane is perpendicular to the deck 13 (unless it is desired to make the cut along a different angle), and the recess 28 is bounded on its sides by parallel edges 29 of the back splash and end splash and at its bottom by a curved edge 30. The curved bottom edge 30 comprises portions 31a and 31b which are symmetrical, which lie along the coved portions 20 of the back splash and end splash and which together form a continuous or nearly continuous curve of nearly circular radius.

Figure 7:
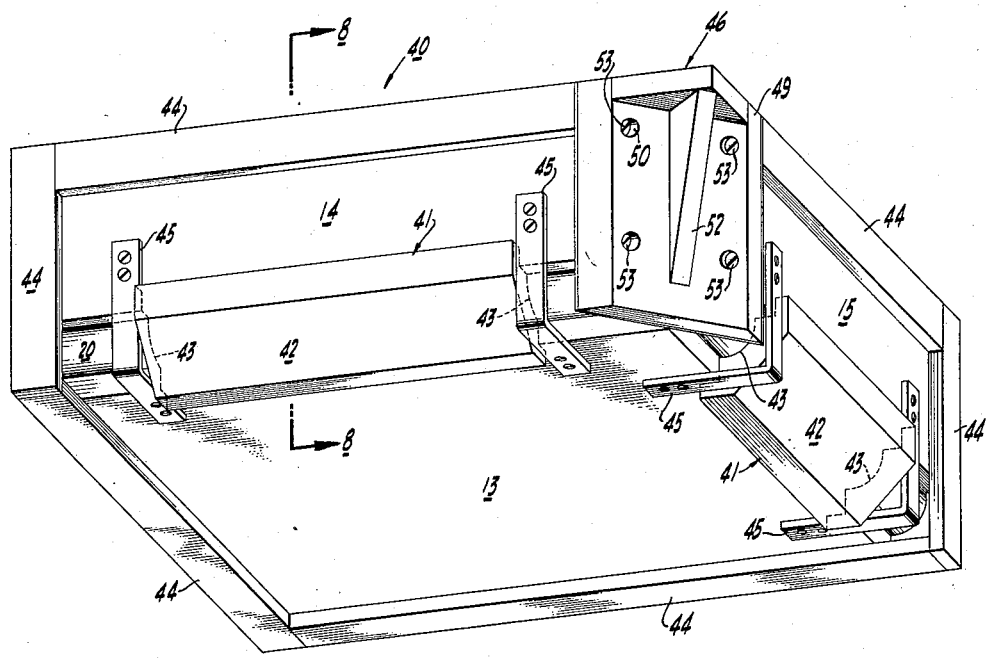
Fig. 7 is a perspective view of the rear and bottom of a complete corner section.
Figure 8:
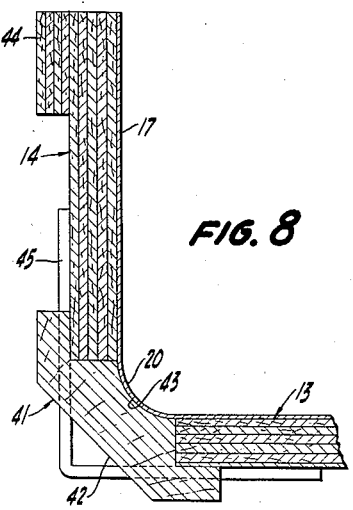
Fig. 8 is a fragmentary section taken along the line 8—8 of Fig. 7.

Referring now to Fig. 7, a complete corner section designated as 40 is illustrated, in which parts similar to those of the above figures are similarly numbered. As illustrated in Figs. 7 and 8, the corner section 40 is provided with cove backings 41 which are beveled at 42 and are formed with curved or dished portions 43 of circular radius to conform to the coves 20 and to provide a backing therefor. Frame members or braces 44 and angle brackets 45 are also provided. A sturdy structure is thus provided.

Referring again to Figs. 5 and 6, and also to Fig. 7, a cornerpiece is also provided which is generally designated as 46. This cornerpiece comprises a core 47 formed of any suitable material, such as plywood, to which is bonded a sheet 48 of sheet plastic identical in composition and appearance to the sheet plastic 17 bonded to the deck, back splash and end splash. The cornerpiece 46 is beveled at 49 and it is formed with screw holes 50. It will be seen that the front surface of the cornerpiece 46 is rectangular, requiring therefore no complex cutting operations or fabrication. The cornerpiece 46 is also provided with a top brace 51 and a rear brace 52 secured thereto by nails, screws or any other suitable means (not shown).

The cornerpiece thus shown is mounted on a corner section 40 by means of screws 53 passing through the screw holes 50, and into the core 16 of the end splash and back splash and by nails or any other suitable means. Also a suitable glue is applied between the cornerpiece 46 and the abutting edges of the end splash, back splash and deck.

It will be understood, of course, that the edges of the U-shaped recess 28 and of the cornerpiece 46 will be suitably sanded before mounting the latter.

It will thus be apparent that a corner structure is provided in which conventional operations of laminating sheet plastic to a core and conventional coving operations are carried out. The resulting cornerpiece is then subjected to the simple operation of cutting along a straight diagonal line, and a cornerpiece or insert is provided which is the essence of simplicity in its structure, fabrication and mounting. The end result is a corner section having an attractive appearance and obviating the difficulties and disadvantages of expedients employed heretofore. It will be apparent that the structure and design thus described are adapted to a wide variety of uses, of decorative or non-decorative character, in which there are three intersecting surfaces coved at their intersections and faced with a sheet material of the character described.

While we have illustrated and described our invention in detail, it is to be understood that various changes may be made therein by those skilled in the art without departing from the spirit of the invention as defined in the appended claims.

Having thus described our invention, what we claim and desire to secure by Letters Patent is:

1. A corner structure comprising three surface portions disposed in three mutually intersecting planes, each said surface portion comprising a surface material which can be coved but which deteriorates when subjected to a drawing operation, two of said surfaces intersecting the third along a radius to provide coved intersections, said two surfaces being cut to provide a U-shaped recess whose boundary lies in a single plane and whose bottom portion is of substantially continuous curvature lying mainly or entirely along said coved intersections; and a corner insert of similar material mounted on the corner structure in abutting relation to said recess and to present a plane surface bounded thereby.

2. A corner structure comprising three surface portions disposed in three mutually intersecting planes, each said surface portion comprising a thermosetting plastic surface material which can be coved but which deteriorates when subjected to a drawing operation, two of said surfaces intersecting the third along a radius to provide coved intersections, said two surfaces being cut to provide a U-shaped recess whose boundary lies in a single plane and whose bottom portion is of substantially continuous curvature lying mainly or entirely along said coved intersections; and a corner insert of similar material mounted on the corner structure in abutting relation to said recess to present a plane surface bounded thereby.

3. A corner structure comprising three surface portions disposed in three mutually intersecting planes, each said surface portion comprising a thin surface layer of thermosetting plastic material which can be coved but which deteriorates when subjected to a drawing operation, and a backing or core, two of said surfaces intersecting the third along a radius to provide coved intersections, said two surfaces being cut to provide a U-shaped recess whose boundary lies in a single plane and whose bottom portion is of substantially continuous curvature lying mainly or entirely along said coved intersections; and a corner insert of similar material mounted on the corner structure in abutting relation to said recess and to present a plane surface bounded thereby.

4. A structure comprising a deck portion and end and back splash portions disposed in three mutually intersecting planes, each said portion being formed of a relatively thick core or backing and of a relatively thin surface layer of thermosetting plastic material bonded to the core, said thermosetting plastic material being of a type which can be coved under heat and pressure but which deteriorates when subjected to a drawing operation; said thermosetting plastic material being continuous and being coved between the deck and back splash and between the deck and end splash, said back splash and end splash being cut at their adjoining ends to provide a generally U-shaped recess whose boundary lies in a single plane and bounded on its sides by the ends of the back splash and end splash and at the bottom by said coved portions and the deck; and a corner insert of similar construction and having a similar surface layer, said corner insert being mounted in abutting relation to the adjacent ends of the back splash and end splash and with its surface layer adjacent thereto, so as to expose a surface layer bounded by said recess.

5. A structure comprising first, second and third surface portions disposed in three mutually intersecting planes and covered with a continuous surface layer of sheet plastic material susceptible to coving but which deteriorates when subjected to a drawing operation; said surface layer being coved at the intersections of the first and second surfaces with the third surface; said surface layer being also cut at adjoining ends of the first and second surfaces to provide a cut whose boundary lies in a single plane and having a curved end portion lying along the coved intersections; and a corner piece surfaced with a similar sheet plastic material, said corner piece being mounted in abutting relation to the boundary of said cut and presenting a plane surface.

References Cited in the file of this patent

UNITED STATES PATENTS

| Number | Name | Date |
| --- | --- | --- |
| 398,597 | Fairbanks | Feb. 26, 1889 |
| 2,194,722 | Roberts | Mar. 26, 1940 |
| 2,293,184 | Weissert | Aug. 18, 1942 |